United States Patent [19]

Thompson

[11] Patent Number: 4,801,060

[45] Date of Patent: Jan. 31, 1989

[54] AUTOMOBILE SEAT DRINKING VESSEL RETAINER

[76] Inventor: Gary L. Thompson, 4161 W. 2550 North, Plain City, Utah 84404

[21] Appl. No.: 125,867

[22] Filed: Nov. 27, 1987

[51] Int. Cl.$^4$ .............................................. B60R 7/00
[52] U.S. Cl. ................................. 224/275; 224/42.42
[58] Field of Search ................... 224/273, 275, 42.42, 224/45.45 R, 311, 42.01; 108/44, 26; 297/414; 296/37.15, 37.8, 37.16

[56] References Cited

U.S. PATENT DOCUMENTS

| | | | |
|---|---|---|---|
| 2,640,595 | 6/1953 | Byford | 224/275 X |
| 2,962,198 | 11/1960 | Bell | 224/275 |
| 4,300,709 | 11/1981 | Page, Jr. | 224/275 |
| 4,303,109 | 12/1981 | Cohen | 224/273 X |

Primary Examiner—Henry J. Recla
Attorney, Agent, or Firm—A. Ray Osburn

[57] ABSTRACT

A drinking vessel retainer for use upon a seat cushion of an automobile. The retainer has a wedge shaped base to hold the vessel upright on sloping seats, and is anchored into the space between the seat and backrest cushions by a flat extension. An open ended, reversible insert, flanged inwardly at one end, enables the holder to support both large and small vessels. According to one aspect of the invention, the retainers are adapted for use in pairs connected in tandem across the seat to save space.

7 Claims, 3 Drawing Sheets

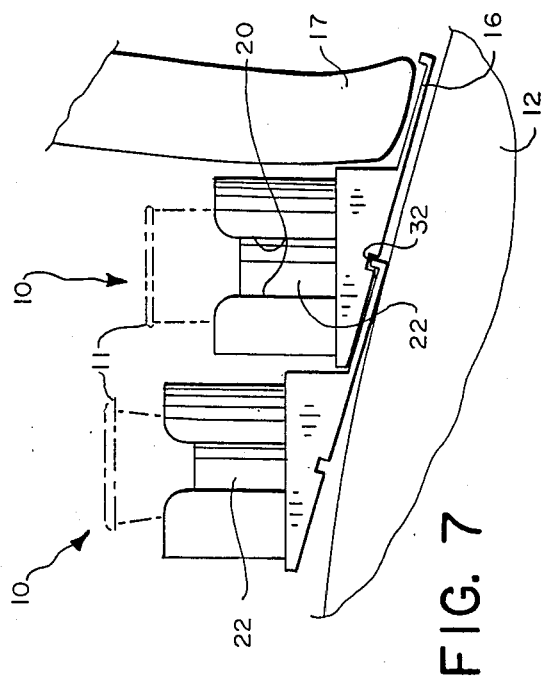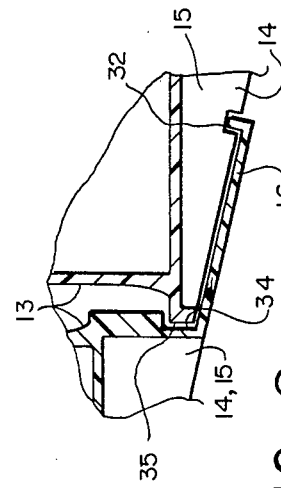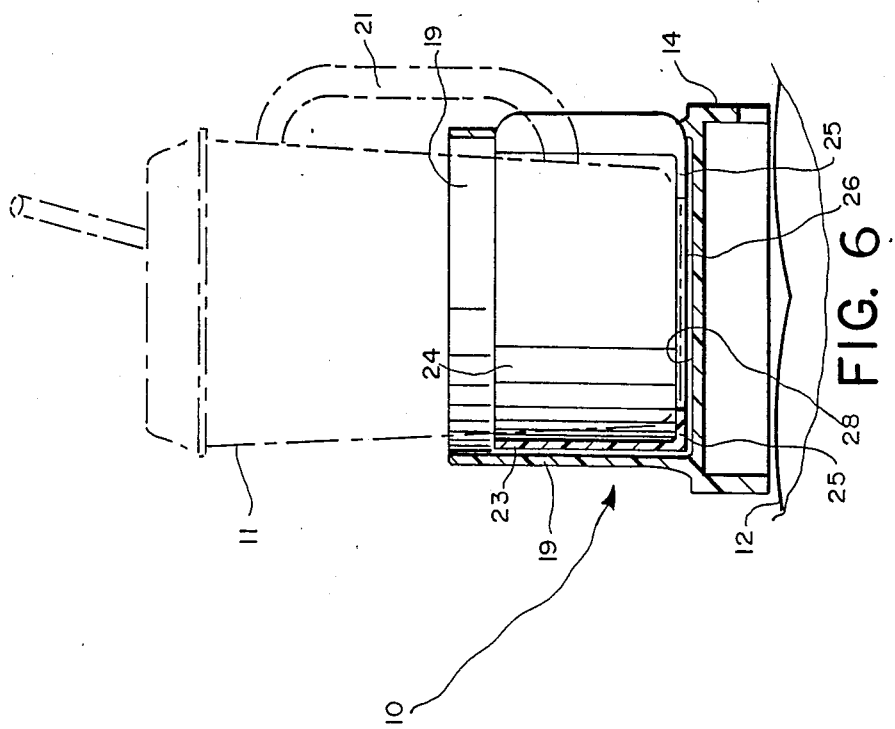

4,801,060

AUTOMOBILE SEAT DRINKING VESSEL RETAINER

BACKGROUND OF THE INVENTION

1. Field:

The present invention relates to devices for retaining articles in an automobile in locations convenient for use by the occupants, and more particularly to such devices for holding beverage vessels upon seat cushions for convenient access by seat occupants.

2. State of the Art:

Automobile beverage vessel retainers have heretofor been intended to be placed, or more positively secured, upon the floor hump or dashboard, the latter sometimes by elastic suction cups. Other retainers hang by hooks variously from door moldings, partially raised window panes, and the like available within the interior of the automobile. Designs intended to rest directly upon automobile seats are less common, even though such location is the most convenient for the seat occupants, such as the driver and front seat passenger. It is difficult to secure the holders stably upon the seat cushions by acceptable means. Suction cups are inoperable on the seat fabrics, and VELCRO strips are generally objectionable in this location, for example. Seat cushions shift in response to shifting passenger position and posture, and most cushions incline sharply in the front to rear direction, so that a stable, level foundation is not provided for drinking vessel holders. Seat mounted article holders are however disclosed in U.S. Pat. Nos. 3,987,945 and 4,300,709. Both include thin flat anchoring extensions which reach rearwardly into the space between the seat and the backrest cushions. The former discloses a box shaped structure for general carrying purposes, collapsible for under seat storage when not in use. The latter includes provisions for beverage containers, albeit embodied in an elaborate console. Vessels for both driver and passenger can be accommodated simultaneously, but only with the use of excessive space on the cushion. The design does not anticipate any seat inclination problem. As with all other prior art drinking vessel holders for automobiles known to the inventor, no provision is made for various sized vessels. Clearly a need exists for a beverage vessel holder which can be mounted stably upon inclining seat cushions of automobiles which serves both passengers of the seat, conserves space upon the seat, and accommodates drinking vessels of various sizes.

BRIEF SUMMARY OF THE INVENTION

With the foregoing in mind, the present invention eliminates or substantially alleviates the shortcomings in the prior art by providing a versatile, stable, drinking vessel retainer adapted for use on the seat cushion of an automobile. The retainer comprises an upwardly opening vessel receptacle with a rearwardly thickening wedge shaped base. The wedge base supports the receptacle in vertical position by compensating for the slope of the seat cushion. A thin horizontal member extends rearwardly from the base, and is adapted to be inserted between the seat and the backrest cushions to firmly anchor the retainer. The wall of the vessel receptacle portion of the retainer is slotted through vertically, preferably on both sides diametrically opposite, to accommodate outstanding handles of cups or mugs used by either the driver or the front seat passenger, for example. The vessel receptacle is sized to accommodate the larger drinking vessels commonly in use in automobiles. An open-ended cylindrical shell insert enables the retainer to be adapted to also accommodate smaller drinking vessels. The adapter is entirely open at one end, but has at the other end an inwardly directed flange. The inward flange is dimensioned to be of proper size to support 12 ounce soft drink cans and other small vessels. For the larger vessels, the sleeve is placed with its open, unflanged, end uppermost, the flange then resting against the upper surface of the base. The adapter sleeve is preferably slotted through vertically its full length, to accommodate vessels with handles, when installed in either position. Advantageously, the adapter shell is sized to be sprung slightly when installed, to then expand to press snugly against the receptacle, to positively retain the shell in place. A pair of radially outstanding tabs may, advantageously, be provided facing each other across the slot to facilitate removal and insertion of the adapter shell.

According to one aspect of the invention, the retainers include provisions to be secured together in tandem from rear to front upon the seat. This provides, simultaneously, a vessel holder for both driver and passenger, and occupies minimum space lengthwise of the seat cushion.

It is therefore the principal object of the invention to provide an improved drinking vessel retainer for use upon an automobile seat, accessible to both seat passengers, and adapted for vessels over a large range of sizes. Further objects and advantages of the invention will be evident from the following detailed description.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figures 1, 2:
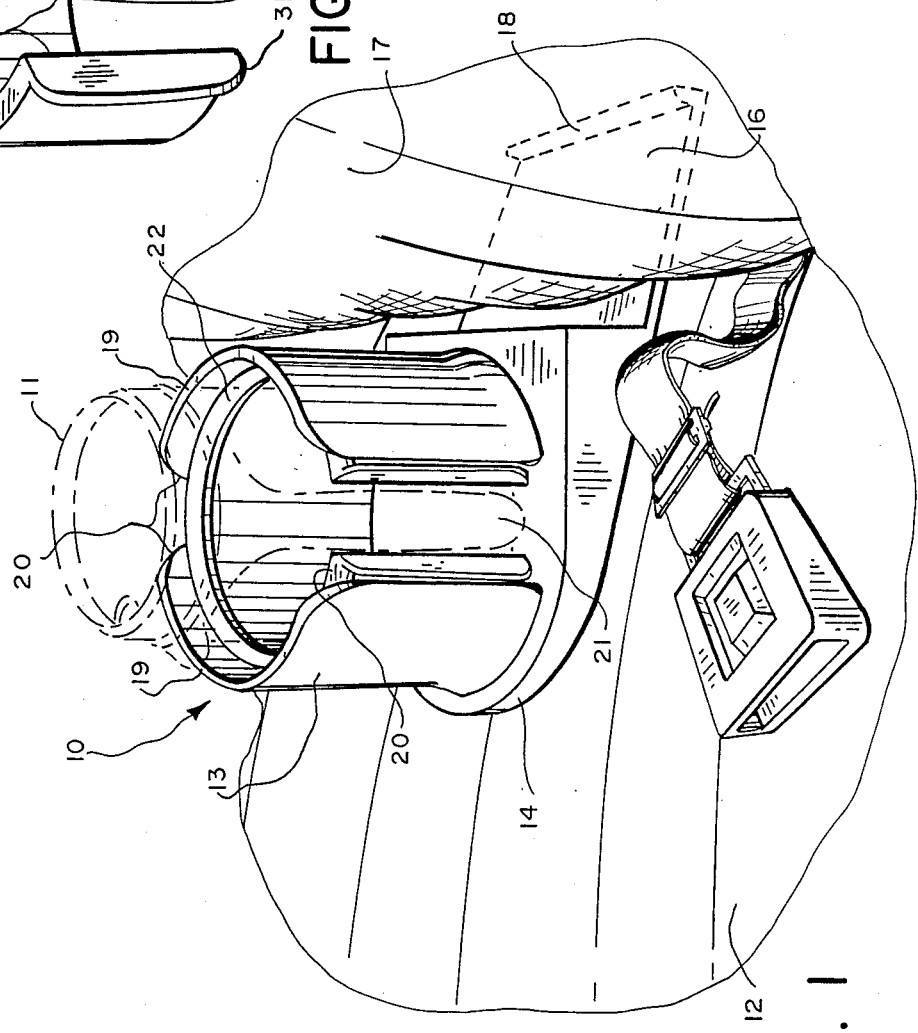
FIG. 1 is a perspective view of an automobile seat drinking vessel retainer in accordance with the invention, shown installed upon the front seat of a vehicle, drawn to a reduced scale, FIG. 2 a perspective view of the insert of the retainer of FIG. 1, drawn to the same scale, FIG. 3 a vertical sectional view of the vessel retainer of FIG. 1, taken along line 3—3 thereof, drawn to the same scale, FIG. 4 a plan view of the vessel retainer of FIG. 1 showing the insert being removed from the retainer, drawn to the same scale, FIG. 5 a side elevation view of the container of FIG. 4, taken along line 5—5 thereof, drawn to the same scale, FIG. 6 a vertical section view of the container of FIG. 1 taken along line 6—6 thereof, the insert thereof being reversed to accommodate a large size drinking vessel, drawn to the scale of FIG. 1, FIG. 7 a side elevation view of a pair of drinking vessel retainers in accordance with the invention coupled in tandem upon the seat of an automobile, drawn to a smaller scale than FIG. 1, and FIG. 8 a vertical sectional view of a fragment of the paired retainers of FIG. 7 showing the notch and recess means for coupling the retainers, drawn to the scale of FIG. 1.

A drinking vessel retainer 10 in accordance with the invention is illustrated in FIG. 1 holding a drinking mug 11 while installed upon the front seat cushion of an automobile. Retainer 11 has an upwardly opening vessel receptacle portion 13 supported by a base member 14 which rests upon the seat cushion 12. Beneath the cup receptacle 13 is a wedge-shaped portion 15 of base 14, so that vessel 11 is supported in vertical position upon the sloping seat 12. A thin, flat rearwardly extending portion 16 of the base 14 anchors retainer 10 to both the seat cushion 12 and the backrest cushion 17. An upstanding ridge 18 is preferably provided to assure firm anchoring.

Upstanding cylindrical wall 19 of the vessel receptacle 13 has a pair of side slots 20 so that drinking vessels with handles 21 may be accommodated. One of the slots 20 is convenient when retainer 1 is used by the driver, and the other in the event of passenger use.

Figure 3:
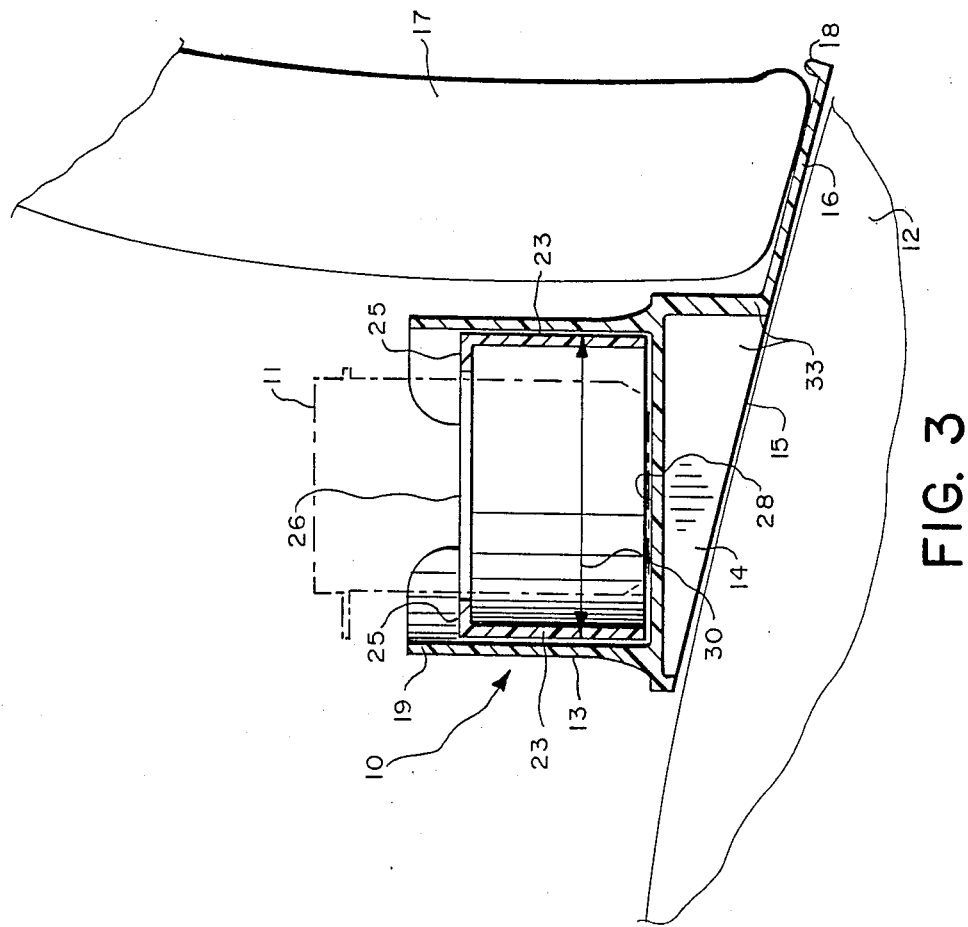

Receptacle 13 is preferably sized to hold the larger drinking vessels 11 in common use in vehicles; e.g. 35 ounce, thick walled, insulated mugs. A reversible insert sleeve 22 permits receptacle 13 to be also used to hold vessels of more moderate and small sizes. (FIGS. 1, 3 and 6) Insert sleeve 22 fits snugly within receptacle 13, with its thin wall 23 preferably in general contact with receptacle wall 19. Sleeve 22 is entirely open at one end 24, but carries an inwardly directed flange 25 at its opposite end 26. For the smaller drinking vessels, sleeve 22 is installed with flange 25 uppermost. (FIGS. 1, 3 and 7) For the larger cups, sleeve 22 is reversed (upended) so that flange 25 rests upon the top surface 28 of base 14, permitting downward insertion of the larger cups. (FIG. 6) The inside diameter 27 of flange 25 is selected to support smaller, handled cups, (FIGS. 1 and 3), and also 12 ounce soft drink cans and paper cups of comparable size. (FIG. 7)

Figure 4:
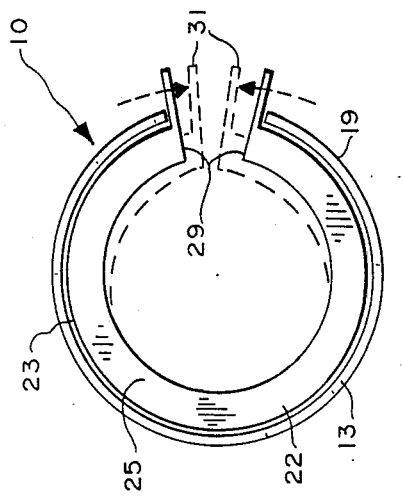
Figure 5:
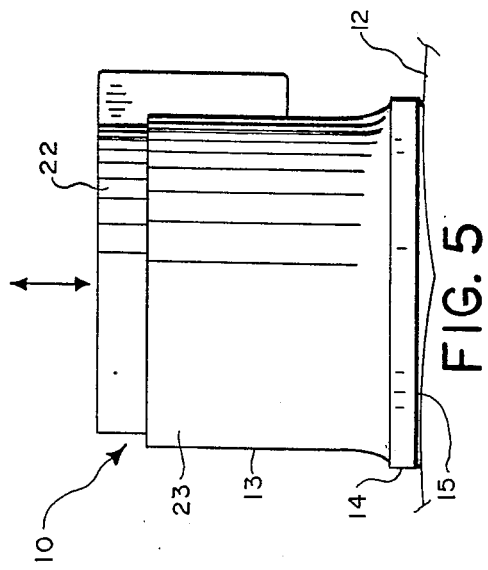

Wall 23 of sleeve 22 is discontinuous at full length slot 29, to accommodate projecting cup handles. Sleeve 22 is preferably sized to be slightly sprung inward when inserted, to then expand snugly against receptacle wall 19. Preferably, a pair of facing ears 31 at sleeve slot 29 are provided to facilitate handling of sleeve insert 22. (FIGS. 4 and 5) When sleeve 22 is not needed, as when a large cup 11 is used, it nevertheless remains within receptacle 13, assuring it is not misplaced or lost when subsequently needed. Clutter inside the automobile is also reduced.

The retainers 10 may advantageously be easily adapted for use in pairs to simultaneously accommodate both the driver and the front seat passenger. (FIGS. 7 and 8) The first of the pair of retainers 10 is secured on seat cushion 12 by anchor strip 16 as previously described. To secure the second retainer 10 to the first, a pair of notches 32 is provided, one on each side of the downstanding side wall 33 of the base wedge 15. The pair of notches 32 are engaged by upstanding ridge 18 on the anchor 16 of the second retainer 10. To more positively connect the pair of retainers together, a recess 34 is provided in the wall 33 at the rear of wedge 15, into which the front end 35 of wedge 15 is inserted.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A drinking vessel retainer which may be used in an automobile upon a conventional substantially horizontal seat cushion, at least a portion of the seating surface of which is inclined upwardly away from a conventional associated substantially vertical backrest cushion, said retainer comprising:
   a drinking vessel receptacle comprising a vertical cylindrical side wall and a horizontal bottom wall defining an upwardly opening vessel receiving cavity; and
   a base member mounted to the bottom surface of said bottom wall for supporting the receptacle upon the seat cushion, said base member having a wedge shaped portion disposed directly beneath said bottom wall to maintain the vessel cavity in substantially vertical position when the retainer is installed upon the inclined portion of the seat and a thin flat member extending laterally from the wedge portion which is to be inserted into the space between the horizontal and vertical cushions to anchor the retainer upon the seat cushion.

2. The retainer of claim 1, further comprising:
   a thin walled sleeve insert sized to fit closely within the cavity of the receptacle, said insert being entirely open at one end and partially closed at the other by a flange projecting substantially inwardly; so that
   the insert may be installed within the receptacle cavity selectively with the flanged end downward to accommodate large drinking vessels and reversely to accommodate smaller vessels.

3. The retainer of claim 2, wherein:
   the receptacle wall carries at least one vertical slot therethrough to provide clearance for outwardly projecting vessel handles; and
   the wall of the insert carries a full length, handle clearing slot.

4. The retainer of claim 3, further comprising:
   retainer coupling means permitting a pair of the retainers to be secured together in tandem forwardly from the backrest cushion.

5. The retainer of claim 4, wherein the coupling means comprises:
   at least one upstanding projection on the anchoring member;
   a downwardly opening notch on the base member forwardly of the projection, adapted to accept the projection of a paired retainer; and
   a rearwardly opening recess at the rearward side of the wedge portion of the base member, adapted to accept the forward end of the wedge portion of the base of a paired retainer when said notch is engaged by said projection.

6. The retainer of claim 3, wherein the insert further comprises:
   a pair of opposing ears outstanding from the wall of the insert on the sides of the slot.

7. The retainer of claim 1, further comprising:
   retainer coupling means permitting a pair of the retainers to be secured together in tandem forwardly from the backrest cushion.

* * * * *